(12) United States Patent
De Jarlais

(10) Patent No.: US 6,383,643 B1
(45) Date of Patent: May 7, 2002

(54) LEACH-PROTECTIVE COATINGS FOR WATER METER COMPONENTS

(75) Inventor: George De Jarlais, Wauwatosa, WI (US)

(73) Assignee: Badger Meter, Inc., Milwaukee, WI (US)

( * ) Notice: Subject to any disclaimer, the term of this patent is extended or adjusted under 35 U.S.C. 154(b) by 0 days.

(21) Appl. No.: 09/382,138

(22) Filed: Aug. 24, 1999

(51) Int. Cl.[7] ................ B32B 15/08; B32B 27/38; B05D 3/02
(52) U.S. Cl. .................. 428/418; 428/413; 427/386
(58) Field of Search .............. 138/145; 428/418; 204/501, 502, 503, 504, 505

(56) References Cited

U.S. PATENT DOCUMENTS

| | | | |
|---|---|---|---|
| 5,376,705 A | | 12/1994 | Leys et al. .......... 523/417 |
| 5,527,614 A | * | 6/1996 | Carpenter et al. ..... 428/418 |
| 5,544,859 A | | 8/1996 | Coltrinari et al. ..... 251/368 |
| 5,582,704 A | * | 12/1996 | Valko et al. ......... 204/501 |
| 5,632,825 A | | 5/1997 | Coltrinari et al. ..... 148/269 |
| 5,707,702 A | * | 1/1998 | Brady, Jr. et al. ..... 428/36.9 |
| 5,760,107 A | | 6/1998 | Valko et al. ......... 523/404 |

FOREIGN PATENT DOCUMENTS

| | | |
|---|---|---|
| DE | 0 287 091 A | 10/1988 |
| FR | 2 398 767 A | 2/1979 |
| WO | WO 96 14363 A | 5/1996 |

OTHER PUBLICATIONS

Industrial Electrocoat Powercron® 590 Cationic Epoxy Electrocoat, B.L. Downey, Broadview, Illinois, 1996.
PCT International Search Report, PCT/US 00/21167, Mar. 8, 2000.

* cited by examiner

*Primary Examiner*—Robert Dawson
*Assistant Examiner*—Michael J Feely
(74) *Attorney, Agent, or Firm*—Quarles & Brady LLP

(57) ABSTRACT

A coated substrate for plumbing applications in which the leaching of metals into water contacting the substrate is significantly reduced, comprises an alloy having copper has a majority constituent and also comprising tin, zinc and lead; and a coating having a thickness in a range from 0.4 to 1.2 mils upon the substrate, the coating further comprising a mixture of an cationic epoxy resin material and a curing agent for said cationic epoxy resin material. The coating is preferably applied by electrodeposition and then cured by baking in an oven at approximately 400° F. for about twenty minutes.

30 Claims, No Drawings

LEACH-PROTECTIVE COATINGS FOR WATER METER COMPONENTS

TECHNICAL FIELD

The present invention relates to coatings for plumbing fixtures and components, such as water meter housings, which will help prevent the leaching of lead and other metals into water supplies.

DESCRIPTION OF THE BACKGROUND ART

Water supply systems are formed by numerous plumbing components including pipes and plumbing fixtures, faucets, valves, couplings and pumps, and further including water meters and their component parts, including water meter housings. Water meter housings have traditionally been made of brass or bronze alloys, either cast or wrought. Such alloys may include lead in amounts from one per cent to eight per cent by weight.

Lead has long been identified as a hazard to humans in certain quantities. To reduce exposure to lead, federal and state government agencies have issued regulations that set standards for acceptable levels of lead in drinking water and the amount of lead that can leach from plumbing fixtures. It is a goal of manufacturers of these products to reduce or eliminate the leaching of lead to the greatest extent possible. Several strategies have been employed by plumbing fixture manufacturers in response to this problem. For example, the amount of lead in the metals used in plumbing fixtures and water meter housings has been reduced to produce new low-lead alloys. The low-lead alloys have not always proved a satisfactory alternative, for several reasons. First, even though lead is present only in small amounts in the low lead alloys, the leaching of other metals may occur. Second, the new materials have not been tested enough to date to guarantee long term reliability. Third, these materials can be uneconomical for some applications.

Some leach-resistant coatings have been proposed, such as bismuth or tin nitrate, but they present a potential to leach their metals.

Plastic housings have been used in some water metering applications, but plastic is not suitable for all applications.

Various other materials have been tested for possible use as coatings for water meter housings, including water-born thermoset materials, UV-cured polymers, clear powder-coat epoxy materials, tin, copper and nickel plating materials and nylon. The metallic coatings tended to show pin-hole defects. The powder coat epoxy and nylon coatings became too thick in places. If a coating becomes too thick, it affects the fit between the housing or fixture and other parts to be assembled with it, and this could impair the accuracy of the meter.

A general object of the invention is to provide an improved barrier coating for water meter housings and other plumbing fixtures, in which the coating provides a barrier of protection against leaching of metals, including lead, from the housing material into water contacting the housing or plumbing fixture in use.

A further general object of the invention is to provide a barrier coating for materials currently in use for plumbing fixtures, so as to retain current foundry and manufacturing methods, reliability in the field and recycling value of current products in the field.

SUMMARY OF THE INVENTION

The invention relates to making a coated substrate having a coating comprising an epoxy resin, a curing agent and optionally, a pigment. The coating is preferably applied using cationic electrolytic methods, but could be applied using other methods, such as brushing or spraying. The coating of the present invention can be applied to substrate materials currently in use, so that new materials and new foundry practices do not have to be developed for new lead-free metals.

Substrates coated with coatings of the invention have exhibited no pin holes or other discontinuities compromising the barrier effect or longevity of the coating. The coating is effective in reducing metal extraction to levels significantly below ANSI/NSF Standard 61 limits, when the housing is assembled in its normal assembly. Coating adhesion and integrity are good. The coating can be applied with a resulting thickness that is sufficiently thin so that chamber insertion and sealing, register bayonet mounting, bottom bolt holes and other close tolerance portions of the housing are not rendered out of tolerance. The coating can be used to reach internal surfaces including underhangs, corners and channels. And, the coating is economical to apply in manufacture.

These and other objects of the present invention will become readily apparent upon further review of the following specification and the drawings which are incorporated herein and which describe and illustrate several preferred embodiments of the invention. Such embodiments are not, however, exhaustive of all possible embodiments, and therefore reference should be made to the claims which follow the description for the legal scope of the invention.

DETAILED DESCRIPTION OF THE PREFERRED EMBODIMENTS

The present invention is incorporated in a coated substrate, such a water meter housing. Such housings have a cylindrical body with pipe coupling extensions extending from opposite sides. A bottom cover may close an access opening to the body cavity, and is often made of the same metal as the main housing part. While the invention is described as being applied to a particular component, the invention is also applicable to other types of plumbing fixtures, including faucets, valves, couplings and pumps.

Preferred materials for water meter housings include alloy materials selected from a group of brasses and bronzes including the following specific examples:

UNS C84400

UNS C83600

Alternative materials have been proposed for water meter housings including the following specific examples:

UNS C87800

UNS C89520

C89833 (Federalloy I-836)

The composition of these alloy materials, with respect to constituents to be discussed herein is specified as follows:

| Alloy No. | Cu (% wt.) | Sn | Pb | Zn |
|---|---|---|---|---|
| C83600 | 84.0–86.0 | 4.0–6.0 | 4.0–6.0 | 4.0–6.0 |
| C84400 | 78.0–82.0 | 2.3–3.5 | 6.0–8.0 | 7.0–10.0 |
| C87800 | 80.0–83.0 | .25 max | .15 max | 12.0–16.0 |
| C89520 | 85.0–87.0 | 5.0–6.0 | .25 max | 4.0–6.0 |
| C89833 | 87.0–91.0 | 4.0–6.0 | .10 max | 2.0–4.0 |

-continued

| Alloy No. | Si (% wt.) | Bi | Se |
|---|---|---|---|
| C83600 | .005 max | — | — |
| C84400 | .005 max | — | — |
| C87800 | 3.8–4.2 | — | — |
| C89520 | .005 max | 1.5–2.5 | 0.8–1.2 |
| C89833 | .005 max | 1.7–2.7 | — |

These alloys also include other metals in small amounts, generally less than 1% by weight.

In all of these alloys the majority constituent is copper, which is present to at least 75% by weight. Alloy Nos. C83600 and C84400 are copper-tin-zinc alloys with some amount of lead. No. C87800 is silicon bronze with substantial zinc and silicon content, but with low lead content. No. C89520 is a copper-bismuth-selenium alloy with low lead content and No. C89833 is a copper-tin-zinc and bismuth alloy with low lead content.

Still other materials which are deemed suitable for application of the present invention include the following list of alloys:

| | | |
|---|---|---|
| UNS C87200 | UNS C92200 | UNS C89835 |
| UNS C87400 | UNS C92300 | UNS C89325 |
| UNS C87500 | UNS C93200 | UNS C89510 |
| UNS C87600 | UNS C93500 | |
| UNS C90300 | UNS C93700 | |
| UNS C90500 | UNS C93800 | |
| UNS C94700 | UNS C83450 | |
| UNS C94800 | UNS C84800 | |
| UNS C94900 | UNS C89831 | |

All of the above alloys have at least 75% copper by weight.

The invention provides for the application of a film coating, preferably by electrodeposition methods.

In the process of electrodeposition, the electrodes are placed in the aqueous bath dispersion. When current is passed between the anode and cathode, an adherent film of the electrodepositable composition will deposit as a substantially continuous film on the cathodes, in this case the parts to be coated. Electrodeposition is usually carried out with a voltage in a range from 50 to 500 volts. The coatings of the present invention can also be applied by methods other than electrodeposition such as brushing, dipping, flow coating, spraying or the like, but electrodeposition is preferred.

A conveyor carries the parts to be coated through an electrodeposition dip tank and through the rinse tanks. The main dip tank has two electrodes disposed in the tank, an anode (+) and a cathode (−). The negative potential is applied to the parts to be coated, rendering them as cathodes, which then attracts the film particles in the form of positive ions to form the final coating.

The coated substrates of the invention are made by first selecting a substrate of a copper-based alloy and then first preparing it by cleaning and rinsing, and then, second, by priming with zinc phosphate. The substrate is then immersed in an electrodeposition bath of a cationic epoxy resin material, a curing agent for the cationic epoxy resin material, deionized water and an acid. There, a coating of the epoxy resin material and a curing agent, having a combined film thickness in a range from approximately 0.4 to approximately 1.2 mils is electrodeposited upon the substrate by making the substrate the negative electrode. After the film is deposited on the substrate, the substrate is removed from the electrodeposition bath, rinsed in two rinse tanks and then cured by baking in an oven heated to about 400° F. The bake cycle occurs over a range from as much forty minutes with the substrate @ 350° F. to as little as fifteen minutes with the substrate @ at least 385° F. Typical oven temperatures may range from 375° F. to 410° F.

To prepare the electrodeposition bath, a main vehicle containing a cationic epoxy resin and a curing agent are blended with deionized water and a solvent in the following proportions:

resin 36.0%±1.5% by weight (incl. curing agent)
solvent 1.0%±0.1% by weight
water 63.0%±1.0% by weight As an option, a pigment paste containing a pigment is mixed in an aqueous dispersion in the following proportions:

| | |
|---|---|
| pigment paste | 55.0% ± 2.0% by weight |
| solvent | 6.6% ± 1.0% by weight |
| water | 50.0% ± 1.0% by weight |

The resulting mixtures of main resin vehicle and a pigment paste (black, for example) are then combined in a resulting aqueous bath in a ratio of approximately 8.5:1.

A fill formula for an electron deposition tank of 1000 gallons is as follows:

| | |
|---|---|
| main resin vehicle | 335 gallons |
| pigment paste | 37 gallons |
| deionized water | 628 gallons |

During operations, components for the bath are generally fed in through lines from supply tanks and the bath is monitored to maintain its composition after reacting its components through electrolytic reaction to form a film on the parts to be coated. The bath is preferably maintained at a temperature of about 90° F. with a controlled pH. Acid can be added to the bath to aid the dispersion of the coating components in the water. Acetic acid, diluted to at least four parts of deionized water, can be used or other acids can also be used.

Specific examples of coatings which can be used to carry out the invention are the Powercron 590-534 Industrial Electrocoat Coating Series available from PPG Industries, Springdale, Pa. PPG CR590 resin is an example of the main vehicle mentioned above, while the pigment paste is available under trade designation PPG CP534. A suitable acid for use in the electrodeposition bath is available under PPG CA532.

These coatings have been used as anti-corrosion coatings for metal automobile parts, generally steel parts. These coatings are lead-free, and are very low in VOC's (volatile organic compounds) and free of HAP's (hazardous air pollutants). They can also be applied as a very thin film, in the range of approximately 0.4 to approximately 1.2 mils in thickness, which does not impair tolerances on manufactured parts to be assembled.

When applied as a coating these materials exhibit the following properties:

The film thickness is from 0.4 to 1.2 mils. The gloss at 60 degrees, according to the ASTM D523-89 method, is 65 to 85. The pencil hardness, according to the ASTM D3363-92A method, is 2H minimum. The direct impact tolerance, according to the ASTM D2794-93 method, is at least 120 in/lbs. The reverse impact tolerance, according to the ASTM D2794-93 method, is at least 100 in/lbs. The cross-hatch adhesion, according to the ASTM D3359-95 method, is 4B to 5B. The humidity tolerance, according to the ASTM D1735-92 method, is at least 1000 hours. The water immersion tolerance, according to the ASTM D870-92 method, is at least 240 hours. The gravelometer, according to the GM 9508P method, is 6 minimum. The throwpower, according to the GM 9535P method, is 12 to 15 inches.

In the present invention, it is preferred that the parts to be coated are cleaned and primed prior to being immersed in the electrodeposition bath. The cleaning would include several clean and rinse baths using aqueous solutions. If the parts have been contaminated with oil as a result of manufacturing, these surfaces are cleaned with solvents. After cleaning, a priming step would be performed using a priming material such as zinc phosphate.

Within the electrodeposition bath itself, constant agitation or flow is maintained so that entrained air and evolving gas bubbles of oxygen and hydrogen from the electrolysis can be removed from the region where the parts are being coated. Otherwise, such bubbles could block the deposition of the film on the substrate.

After the parts are removed from the bath, and rinsed in the rinse tanks, they are placed in a curing (baking) oven at a temperature in the range from approximately 375° F. to approximately 410° F.

A description of suitable cationic epoxy resins applied by electrodeposition can be found in Valko et al., U.S. Pat. No. 5,582,704, and Valko et al., U.S. Pat. No. 5,760,107. These patents provide a description of additional suitable coatings and equivalents for use in the present invention, comprising as a first component, (A) a cationic resin which is derived from a polyepoxide and which contains in the resin molecules cationic salt groups and active hydrogen groups selected from aliphatic hydroxyl and primary and secondary amino; and present as a separate component (B) a fully capped polyisocyanate curing agent containing substantially no free isocyanate groups. The electrodepositable composition further contains from about 0.02 to 1.0 milleequivalents (meq) phenolic hydroxyl groups per gram of resin solids, and from about 0.1 to 2.0 meq beta-hydroxy ester groups per gram of resin solids.

The phenolic hydroxyl groups and beta-hydroxy ester groups present in the composition may be present in any combination in component (A) and/or component (B), both groups may be present in both components, or one or both types of groups may be present in component (A) while the other (or both) is in component (B). In addition, components (A) and (B) need not contain the phenolic hydroxyl groups and beta-hydroxy ester groups present in the composition. The phenolic hydroxyl groups and beta-hydroxy ester groups may be present in a third and/or fourth component different from (A) and (B).

The cationic resin of component (A) is derived from a polyepoxide, which may be chain extended by reacting together a polyepoxide and a polyhydroxyl group-containing material selected from alcoholic hydroxyl group-containing materials and phenolic hydroxyl group-containing materials and phenolic hydroxy group-containing materials to chain extend or build the molecular weight of the polyepoxide. The resin contains cationic salt groups and active hydrogen groups selected from aliphatic hydroxyl and primary and secondary amino.

The polyepoxide preferably has at least two 1,2-epoxy groups. In general, the epoxide equivalent weight of the polyepoxide will range from 100 to about 2000, typically from about 180 to 500. The epoxy compounds may be saturated or unsaturated, cyclic or acyclic, aliphatic, alicyclic, aromatic or heterocyclic. They may contain sub-constituents such as halogen, hydroxyl, and ether groups.

Examples of polyepoxides are those having a 1,2-epoxy equivalency greater than one and preferably about two; that is, polyepoxides which have on average two epoxide groups per molecule. The preferred polyepoxides are polyglycidyl ethers of cyclic polyols. Particularly preferred are polyglycidyl ethers of polyhydric phenols such as Bisphenol A.

Component (A) also contains cationic salt groups. The cationic salt groups are preferably incorporated into the resin by reacting the epoxy group-containing resinous reaction product prepared as described above with a cationic salt group former. By "cationic salt group former" is meant a material which is reactive with epoxy groups and which can be acidified before, during, or after reaction with the epoxy groups to form cationic salt groups. Examples of suitable materials include amines such as primary and secondary amines which can be acidified after reaction with the epoxy groups to form amine salt groups, or tertiary amines which can be acidified prior to reaction with the epoxy groups and which after reaction with the epoxy groups form quaternary ammonium salt groups. Examples of other cationic salt group formers are sulfides which can be mixed with acid prior to reaction with the epoxy groups and form ternary sulfonium salt groups upon subsequent reaction with the epoxy group.

When amines are used as the cationic salt formers, monoamines are preferred, and hydroxyl-containing amines are particularly preferred. Polyamines may be used but are not recommended because of a tendency to gel the resin.

Tertiary and secondary amines are preferred to primary amines because primary amines are polyfunctional with respect to epoxy groups and have a greater tendency to gel the reaction mixture. If polyamines or primary amines are used, they should be used in a substantial stoichiometric excess to the epoxy functionality in the polyepoxide so as to prevent gelation and the excess amine should be removed from the reaction mixture by vacuum stripping or other technique at the end of the reaction. The epoxy may be added to the amine to ensure excess amine.

The reaction product of the primary and/or secondary amine and the polyepoxide is made cationic and water dispersible by at least partial neutralization with an acid. Suitable acids include organic and inorganic acids such as formic acid, acetic acid, lactic acid, phosphoric acid and sulfamic acid. The extent of neutralization varies with the particular reaction product involved. However, sufficient acid should be used to disperse the electrodepositable composition in water. Typically, the amount of acid used provides at least 20 percent of all of the total neutralization. Excess acid may also be used beyond the amount required for 100 percent total neutralization.

The extend of cationic salt group formation should be such that when the resin is mixed with an aqueous medium and the other ingredients, a stable dispersion of the electrodepositable composition will form. By "stable dispersion" is meant one that does not settle or is easily redispersed if some settling occurs. Moreover, the dispersion should be of sufficient cationic character that the dispersed particles will migrate toward an electrodeposit on a cathode when an electrical potential is set up between an anode and a cathode immersed in the aqueous dispersion.

Generally, component (A) of the electrodepositable composition is non-gelled and contains from about 0.1 to 3.0, preferably from about 0.1 to 0.7 millequivalents of cationic salt group per gram of resin solids. The number average molecular weight of component (A) preferably ranges from about 2,000 to about 15,000, more preferably from about 5,000 to about 10,000. By "non-gelled" is meant that the resin is substantially free from crosslinking, and prior to cationic salt group formation, the resin has a measurable intrinsic viscosity when dissolved in a suitable solvent. In contrast, a gelled resin, having an essentially infinite molecular weight, would have an a high intrinsic viscosity.

Beta-hydroxy ester groups may be incorporated into component (A) by ring opening 1,2-epoxide groups of the polyepoxide with a material which contains at least one carboxylic acid group.

Phenolic hydroxyl groups may be incorporated into component (A) by using a stoichiometric excess of the polyhydric phenol during initial chain extension of the polyepoxide.

When component (A) contains both phenolic hydroxyl groups and beta-hydroxy ester groups, the phenolic hydroxyl groups may be incorporated simultaneously with the beta-hydroxy ester groups, or sequentially before or after. Preferably, however, the phenolic hydroxyl groups are incorporated into component (A) after incorporation of the beta-hydroxy ester groups by reacting a stoichiometric excess of polyhydric phenol with the resulting polyepoxide. Once again, despite the stoichiometric excess of phenolic hydroxyl groups to epoxy being used, unreacted epoxy groups remain in the resulting resinous reaction product for subsequent reaction with the cationic salt group former.

The polyisocyanate curing agent of component (B) is a fully capped polyisocyanate with substantially no free isocyanate groups. The polyisocyanate can be aliphatic or an aromatic polyisocyanate or a mixture of the two. Diisocyanates are preferred, although higher polyisocyanates an be used in place of or in combination with diisocyanates.

Any suitable aliphatic, cycloaliphatic, or aromatic alkyl monoalcohol or phenolic compound may be used as a capping agent for the polyisocyanate in component (B) including, for example, lower aliphatic alcohols such as methanol, ethanol, and n-butanol; cycloaliphatic alcohols such as cyclohexanol; aromatic-alkyl alcohols such as phenyl carbinol and methylphenyl carbinol; and phenolic compounds such as phenol itself and substituted phenols wherein the sub-constituents do not affect coating operations, such as cresol and nitrophenol. Glycol ethers may also be used as capping agents. Suitable glycol ethers include ethylene glycol butyl ether, diethylene glycol butyl ether, ethylene glycol methyl ether and propylene glycol methyl ether. Diethylene glycol butyl ether is preferred among the glycol ethers.

Beta-hydroxy ester groups may be incorporated into component (B) by reacting the isocyanate groups of the polyisocyanate with the hydroxyl group of a hydroxyl group-containing carboxylic acid such as dimethylolpropionic acid, malic acid, and 12-hydroxystearic acid.

Examples of polyepoxides which may be used to form the beta-hydroxy ester groups in component (B) are those having a 1,2-epoxy equivalency greater than one and preferably about two; that is, polyepoxides which have on average two epoxide groups per molecule. The preferred polyepoxides are polyglycidyl ethers of cyclic polyols. Particularly preferred are polyglycidyl ethers of polyhydric phenols such as Bisphenol A.

Phenolic hydroxyl groups may be incorporated into component (B) by capping the isocyanate groups with phenolic materials having an aliphatic and a phenolic hydroxyl group such as 2-hydroxybenzyl alcohol.

Beta-hydroxy ester groups may alternatively be incorporated into the electrodepositable composition of the present invention by a third component (C) which is different from (A) and (B). Such a component may be a reaction product of an epoxy functional material, such as a polyepoxide, typically those mentioned above, and a carboxylic acid functional material. Suitable carboxylic acid functional materials include dimethylolpropionic acid, tartaric acid, or the product of a polyol or polyamine reacted with the anhydride of a polybasic acid. Examples include ethylene glycol or ethylene diamine reacted with a succinic anhydride.

Component (C) may further include free phenolic hydroxyl groups. Typically, these may be incorporated by reacting a portion of the epoxy functional material with a carboxylic acid functional material as mentioned above and then reacting the remaining epoxy groups with a stoichiometric excess of a polyhydric phenol.

Free phenolic hydroxyl groups may also be incorporated into the composition of the present invention by a fourth component (D) which is different than the other components. Suitable components include polymers and/or copolymers of hydroxyl functional styrenic monomers such as poly-p-hydroxy stryrene, and a polyepoxide as mentioned above reacted with a stoichiometric excess of a polyhydric phenol, a phenol-formaldehyde condensation product, or polymers and/or copolymers of hydroxyl functional styrenic monomers such as a poly-p-hydroxy styrene.

Example 1

This example illustrates the treatment of various meter housing components according to the present invention. Leaching tests were conducted under NSF 61, section 8 protocol using pH 8 water for leaching of substrate metals and extraction of metals from the coating itself. Five specimens of uncoated meter casings of No. C84400 (nominally 7% lead) brass alloy were tested, along with five specimens of uncoated meter casings of No. C89520 (less than 1% lead) brass alloy and five specimens of coated meter casings of No. C84400 (nominally 7lead) brass alloy. The coating was applied by electrodeposition as described above to a nominal film thickness of 0.6 mils. The coating was black.

Under the NSF-61 testing procedure, the fixtures are flushed with tap water for 15 minutes, then rinsed with deionized water. The fixtures are then prepared for testing by rinsing with 3 volumes of an extraction water having a pH of 8.0±0.5, hardness of 500 ppm and 2 ppm of free chlorine in reagent water.

Following the aforementioned preparation, the specimens are exposed to extraction water at either a cold temperature or hot temperature, depending on the intended use of the fixture. The cold temperature is 23°±2° C. (73.4°±3.6° F.), while the hot temperature is 60°±2 C. (140°±3.6° F.) for domestic use or 82°±2° C. (180°±3.6° F.) for commercial use. For the purposes of this test, each fixture treated was tested with cold extraction water.

Conditioning is conducted by exposure at room temperature (23 ±3.2 C.) to the extraction water used for testing for fourteen days. The water is changed at least ten (10) times during the 14-day conditioning period. Following the conditioning period, the samples are subjected to exposures. Exposures are conducted for at least 24-hours. The samples in these tests received three exposures, with the third day exposure being taken as the reading. The results of each group of specimens were averaged within the group.

The amount of lead leaching into water from copper-alloy fixtures was significantly reduced as a result of the coating. Using the five specimens of uncoated meter casings of No.

C84400 (nominally 7% lead) brass alloy as the control, the five specimens of uncoated low lead meter casings of No. C89520 exhibited on average, 1/16 the number of ppm of the control group. The five specimens of coated meter casings of No. C84400 (nominally 7% lead) brass alloy exhibited 3/8 the number of ppm of the low lead housings and 3/144 the number of pm of the uncoated control group. Leaching of other metals for the coated No. C84400 were also at very low levels and much better than the other two groups.

Specimens of the meter housings coated with the new coating were also tested under the following tests:

ASTM B287 (Acetic Acid-Salt Spray (fog) Testing) for integrity;

ASTM B117 (Salt Spray (fog) Testing) for integrity;

ANSI/AWWA C550, Sec. 4.1.2 for integrity; and

Various soak tests in different types of water for integrity.

The results were the coatings showed no pin holes and good integrity.

Therefore, the coated substrates of the present invention offer advantages over anything known heretofore in solving the problem of leaching from this type of fixture.

This has been a description of how the invention can be carried out. Those of ordinary skill in the art will recognize that various details may be modified in arriving at other detailed embodiments, and these embodiments will come within the scope of the invention.

Therefore, to apprise the public of the scope of the invention and the embodiments covered by the invention, the following claims are made.

We claim:

1. A coated substrate in which the leaching of metals into water contacting the substrate is reduced in comparison to an uncoated substrate, the coated substrate comprising:
   a water meter component made of an alloy having at least 75% copper by weight; and
   a coating having a thickness in a range from approximately 0.4 to approximately 1.2 mils upon the substrate, wherein said coating comprises a mixture of an epoxy resin material and a curing agent for said epoxy resin material; and wherein said coating has been cured over a cure cycle.

2. The coated substrate of claim 1, in which the water meter component is made of an alloy further comprising tin, zinc and lead.

3. The coated substrate of claim 1, wherein the thickness of the coating averages approximately 0.6 mils.

4. The coated substrate of claim 1, wherein the cure cycle is conducted by heating in a range from forty minutes with the substrate @ 350° F. to fifteen minutes with the substrate @ at least 385° F.

5. The coated substrate of claim 1, in which the epoxy resin material is a cationic epoxy resin material that has been applied by electrodeposition.

6. The coated substrate of claim 5, in which the epoxy resin material further comprises a cationic resin which is derived from a polyepoxide and which contains resin molecule cationic salt groups and active hydrogen groups selected from aliphatic hydroxyl and primary and secondary amines, and present as a second component, a fully capped polyisocyanate curing agent containing substantially no free isocyanate groups.

7. The coated substrate of claim 6, wherein the coating further comprises a pigment paste giving the coating a color.

8. The coated substrate of claim 7, wherein the color is black.

9. The coated substrate of claim 1, 2, 3, 4, 5, 6, 7 or 8, wherein the substrate is a component for a water meter formed of a copper-based alloy comprising:
   copper in amount from 78% to 91% by weight; tin in an amount from 0.01% to 6% by weight; zinc in an amount from 2% to 16% by weight and lead in an amount from 0.005% to 8% by weight.

10. The coated substrate of claim 9, wherein the alloy further comprises bismuth in an amount from 1.5% to 2.70by weight.

11. The coated substrate of claim 9, wherein the alloy further comprises silicon in an amount from 0.001% to 4.2% by weight.

12. The coated substrate of claim 11, wherein the alloy further comprises selenium in an amount from 0.35% to 1.2by weight.

13. A method of providing a water meter component with anti-leaching properties, the method comprising:
   applying a coating of an epoxy resin material and a curing agent for said epoxy resin material to a water meter component having at least 75% copper by weight; and
   curing the coating.

14. The method of claim 13, wherein the coating is applied in a thickness in a range from approximately 0.4 to approximately 1.2 mils.

15. The method of claim 13, wherein the curing is conducted by heating in a range from forty minutes with the substrate @ 350° F. to fifteen minutes with the substrate @ at least 385° F.

16. The method of claim 13, in which the coating is applied by electroplating.

17. The method of claim 14 or 15, further comprising cleaning the water meter component by placing the water meter component in an aqueous solution of a cleaning agent, and then rinsing the component before applying the coating.

18. The method of claim 15 or 16, including priming the water meter component prior to applying the coating.

19. The method of claim 13, in which the epoxy resin material is a cationic epoxy resin material that has been applied by electrodeposition.

20. The method of claim 19, in which the epoxy resin material further comprises a cationic resin which is derived from a polyepoxide and which contains resin molecule cationic salt groups and active hydrogen groups selected from aliphatic hydroxyl and primary and secondary amines, and present as a second component, a fully capped polyisocyanate curing agent containing substantially no free isocyanate groups.

21. The method of claim 20, in which the coating is applied by electroplating.

22. The method of claim 21, wherein the curing is conducted by heating in a range from forty minutes with the substrate @ 350° F. to fifteen minutes with the substrate @ at least 385° F.

23. The method of claim 21, wherein the copper-based alloy further comprises: tin in an amount from 0.01% to 6% by weight; zinc in an amount from 2% to 16% by weight.

24. The method of claim 21, wherein the alloy further comprises silicon in an amount from 0.001% to 4.2% by weight.

25. The method of claim 21, wherein the alloy further comprises bismuth in an amount from 1.5% to 2.7% by weight.

26. The method of claim 21, wherein the alloy further comprises selenium in an amount from 0.35% to 1.2% by weight.

27. The method of claim 21, wherein the coating is applied in a thickness in a range from approximately 0.4 to approximately 1.2 mils.

28. The method of claim 21, in which the epoxy resin material is a cationic epoxy resin material.

29. The method of claim 21, in which the epoxy resin material further comprises a cationic resin which is derived from a polyepoxide and which contains resin molecule cationic salt groups and active hydrogen groups selected from aliphatic hydroxyl and primary and secondary amines, and present as a second component, a fully capped polyisocyanate curing agent containing substantially no free isocyanate groups.

30. A method of providing a water meter component with anti-leaching properties, which comprises:
   applying a coating of an epoxy resin material and a curing agent for said epoxy resin material to a water meter component having a copper-based alloy comprising copper in amount from 75% to 91% by weight and lead in an amount from 0.005% to 8% by weight; and
   curing the coating.

* * * * *

UNITED STATES PATENT AND TRADEMARK OFFICE
CERTIFICATE OF CORRECTION

PATENT NO. : 6,383,643 B1
DATED : May 7, 2002
INVENTOR(S) : George De Jarlais

It is certified that error appears in the above-identified patent and that said Letters Patent is hereby corrected as shown below:

<u>Column 4,</u>
Line 56, "(hazardous air 30 pollutants)." should be -- (hazardous air pollutants). --;

<u>Column 8,</u>
Line 32, "NSF 6l" should be -- NSF 61 --;
Line 39, "7lead)" should be -- 7% lead) --;

<u>Column 9,</u>
Line 7, "number of pm" should be -- number of ppm --;

<u>Column 10,</u>
Line 10, "2.70by weight" should be -- 2.7% by weight --;
Line 16, "1.2by weight" should be -- 1.2% by weight --.

Signed and Sealed this

Twenty-second Day of April, 2003

JAMES E. ROGAN
*Director of the United States Patent and Trademark Office*